United States Patent
Liu

(10) Patent No.: US 12,425,171 B2
(45) Date of Patent: Sep. 23, 2025

(54) UPLINK MANAGEMENT FOR TRUE WIRELESS EARBUDS

(71) Applicant: Google LLC, Mountain View, CA (US)

(72) Inventor: Peter T. Liu, Sunnyvale, CA (US)

(73) Assignee: GOOGLE LLC, Mountain View, CA (US)

(*) Notice: Subject to any disclaimer, the term of this patent is extended or adjusted under 35 U.S.C. 154(b) by 368 days.

(21) Appl. No.: 18/125,978

(22) Filed: Mar. 24, 2023

(65) Prior Publication Data

US 2024/0063981 A1 Feb. 22, 2024

Related U.S. Application Data

(60) Provisional application No. 63/398,798, filed on Aug. 17, 2022.

(51) Int. Cl.
*H04L 5/00* (2006.01)
*H04R 1/10* (2006.01)

(52) U.S. Cl.
CPC ......... *H04L 5/0055* (2013.01); *H04R 1/1041* (2013.01); *H04R 2420/07* (2013.01)

(58) Field of Classification Search
CPC . H04L 5/0055; H04R 1/1041; H04R 2420/07; H04R 1/1091; H04R 5/033; H04R 1/1016
See application file for complete search history.

(56) References Cited

U.S. PATENT DOCUMENTS

| | | | |
|---|---|---|---|
| 10,200,791 B1 | 2/2019 | Liu et al. | |
| 2017/0068437 A1* | 3/2017 | Warren | G05B 19/048 |
| 2019/0230459 A1 | 7/2019 | Sridharan et al. | |
| 2023/0155733 A1* | 5/2023 | Cheong | H04L 1/189 370/392 |
| 2024/0080134 A1* | 3/2024 | Zhu | G06F 3/162 |

FOREIGN PATENT DOCUMENTS

| | | | | |
|---|---|---|---|---|
| CN | 108886828 B | * | 11/2021 | H04W 72/02 |
| WO | 2021/205235 A1 | | 10/2021 | |

* cited by examiner

*Primary Examiner* — Charles C Jiang
(74) *Attorney, Agent, or Firm* — DORITY & MANNING P.A.

(57) ABSTRACT

Various arrangements for managing which earbud transmits microphone audio are presented herein. A first earbud of a pair of true wireless earbuds may receive a downstream audio packet addressed to a second earbud of the pair of true wireless earbuds. This first earbud can then transmit a negative acknowledgement indicating that the downstream audio packet was not properly received despite the first earbud having properly received the downstream audio packet. With the negative acknowledgment, the first earbud can then transmit an upstream audio packet using an identity of the second earbud.

20 Claims, 10 Drawing Sheets

UPLINK MANAGEMENT FOR TRUE WIRELESS EARBUDS

CROSS REFERENCES TO RELATED APPLICATIONS

This Application claims priority to U.S. Provisional Patent Application No. 63/398,798, entitled "Streamlining User Experience with LE Audio True Wireless Earbuds," filed on Aug. 17, 2022, the entire disclosure of which is hereby incorporated by reference for all purposes.

BACKGROUND

Various device-to-device communication protocols, such as Bluetooth LE Audio, do not define a mechanism that allows for a set of true wireless stereo (TWS) earbuds to swap microphones during a phone call. For various reasons, it can be desirable for earbuds to swap which earbud is transmitting audio from its microphone (e.g., the user's voice).

SUMMARY

Various embodiments are described related to a method for managing which earbud transmits microphone audio. In some embodiments, a method for managing which earbud transmits microphone audio is described. The method may comprise receiving, by a first earbud of a pair of true wireless earbuds, a downstream audio packet addressed to a second earbud of the pair of the true wireless earbuds. The method may comprise transmitting, by the first earbud, a negative acknowledgement indicating that the downstream audio packet was not properly received despite the first earbud having properly received the downstream audio packet. The method may comprise transmitting, by the first earbud, with the negative acknowledgment, an upstream audio packet using an identity of the second earbud. Audio included in the upstream audio packet may have been captured using a microphone of the first earbud.

Embodiments of such a method may include one or more of the following features: the method may further comprise prior to receiving the downstream audio packet, determining, by the pair of the true wireless earbuds, that the first earbud may begin serving as a primary earbud instead of the second earbud. The primary earbud may be responsible for wirelessly transmitting audio captured using one or more microphones of the pair of true wireless earbuds data. The method may further comprise receiving, by the first earbud, an acknowledgement that the upstream audio packet was properly received by a source device and a resend of the downstream audio packet addressed to the second earbud. The method may further comprise transmitting, by the first earbud, an acknowledgement to the source device in response to the received acknowledgement that the upstream audio packet was properly received by the source device. The method may further comprise receiving, by the first earbud, a second downstream audio packet addressed to the first earbud. The method may further comprise transmitting, by the first earbud, in response to receiving the second downstream audio packet, an acknowledgment that the second downstream audio packet was properly received by the first earbud. The method may further comprise receiving, by the second earbud, the downstream audio packet, the resend of the downstream audio packet, or both. The second earbud may not transmit either an acknowledgment or negative acknowledgment in response to receiving. The method may further comprise prior to receiving the downstream audio packet and prior to determining that the first earbud is to begin serving as the primary earbud, receiving, by the second earbud, a second downstream audio packet. The second earbud may be serving as the primary earbud when the second downstream audio packet is received. The method may further comprise transmitting, by the second earbud, an acknowledgement indicating that the second downstream audio packet was properly received by the second earbud. The method may further comprise transmitting, by the second earbud, with the acknowledgment, a second upstream audio packet using the identity of the second earbud. The audio included in the upstream audio packet was captured using a microphone of the second earbud. The earbuds and an audio source may communicate using the Bluetooth Low Energy (LE) Audio protocol. A single Bluetooth LE Audio Telephony and Media Audio Profile (TMAP) configuration may be used continuously while the second earbud may serve as the primary earbud and transmit the second upstream audio packet and while the first earbud may serve as the primary earbud and transmit the upstream audio packet. The single Bluetooth LE Audio TMAP configuration may be Configuration C. The method may further comprise receiving, by the first earbud, a second downstream audio packet addressed to the first earbud. The second downstream audio packet may include same audio data as the downstream audio packet due to a mono audio channel being output to the pair of the true wireless earbuds. The method may further comprise determining, by the second earbud, that the second downstream audio packet addressed to the first earbud was not successfully sniffed. The method may further comprise in response to determining that the second downstream audio packet was not successfully sniffed, transmitting, by the second earbud, an interferer packet timed to prevent an acknowledgment transmitted by the first earbud in response to the second downstream audio packet from being successfully received by an audio source device.

In some embodiments, a wireless earbud system is described. The system may comprise a first earbud comprising: a first wireless interface, a first speaker, a first processing system, and a first microphone. The system may comprise a second earbud comprising: a second wireless interface, a second speaker, a second processing system, and a second microphone. The first earbud may not be physically connected with the second earbud. The first earbud may be configured to receive a downstream audio packet addressed to the second earbud. The first earbud may be configured to transmit a negative acknowledgement indicating that the downstream audio packet was not properly received despite the first earbud having properly received the downstream audio packet. The first earbud may be configured to transmit, with the negative acknowledgment, an upstream audio packet using an identity of the second earbud. Audio included in the upstream audio packet was captured using the first microphone of the first earbud.

Embodiments of such a system may include one or more of the following features: the first earbud and the second earbud may be configured to, prior to receiving the downstream audio packet, determine that the first earbud is to begin serving as a primary earbud instead of the second earbud. The primary earbud may be responsible for wirelessly transmitting audio captured using one or more microphones of the first and second earbud. The first earbud may be further configured to receive an acknowledgement that the upstream audio packet was properly received by a source device and a resend of the downstream audio packet addressed to the second earbud. The first earbud may be further configured to transmit an acknowledgement to the source device in response to the received acknowledgement that the upstream audio packet was properly received by the source device. The first earbud may be further configured to receive a second downstream audio packet addressed to the first earbud. The first earbud may be further configured to transmit, in response to receiving the second downstream audio packet, an acknowledgment that the second downstream audio packet was properly received by the first earbud. The second earbud may be configured to receive the downstream audio packet, the resend of the downstream audio packet, or both. The second earbud may be configured to not transmit either an acknowledgment or negative acknowledgment in response to receiving. The second earbud may be further configured to prior to receiving the downstream audio packet and prior to determining that the first earbud is to begin serving as the primary earbud, receive a second downstream audio packet. The second earbud may be serving as the primary earbud when the second downstream audio packet is received. The second earbud may be further configured to transmit an acknowledgement indicating that the second downstream audio packet was properly received by the second earbud. The second earbud may be further configured to transmit, with the acknowledgment, a second upstream audio packet using the identity of the second earbud. The audio included in the upstream audio packet was captured using the second microphone of the second earbud. The first earbud and the second earbud may communicate with an audio source communicate using the Bluetooth Low Energy (LE) Audio protocol. A single Bluetooth LE Audio Telephony and Media Audio Profile (TMAP) configuration may be used continuously while the second earbud serves as the primary earbud and transmits the second upstream audio packet and while the first earbud serves as the primary earbud and transmits the upstream audio packet. The single Bluetooth LE Audio TMAP configuration may be Configuration C.

In some embodiments, a wireless earbud is described. The wireless earbud may comprise a wireless interface. The wireless earbud may comprise a microphone. The wireless earbud may comprise a speaker. The wireless earbud may comprise a processing system in communication with the wireless interface, the microphone, and the speaker. The wireless earbud may not be physically connected with a second earbud. The wireless earbud may be configured to receive a downstream audio packet addressed to the second earbud. The wireless earbud may be configured to transmit a negative acknowledgement indicating that the downstream audio packet was not properly received despite the wireless earbud having properly received the downstream audio packet. The wireless earbud may be configured to transmit, with the negative acknowledgment, an upstream audio packet using an identity of the second earbud. Audio included in the upstream audio packet was captured using the microphone of the wireless earbud.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
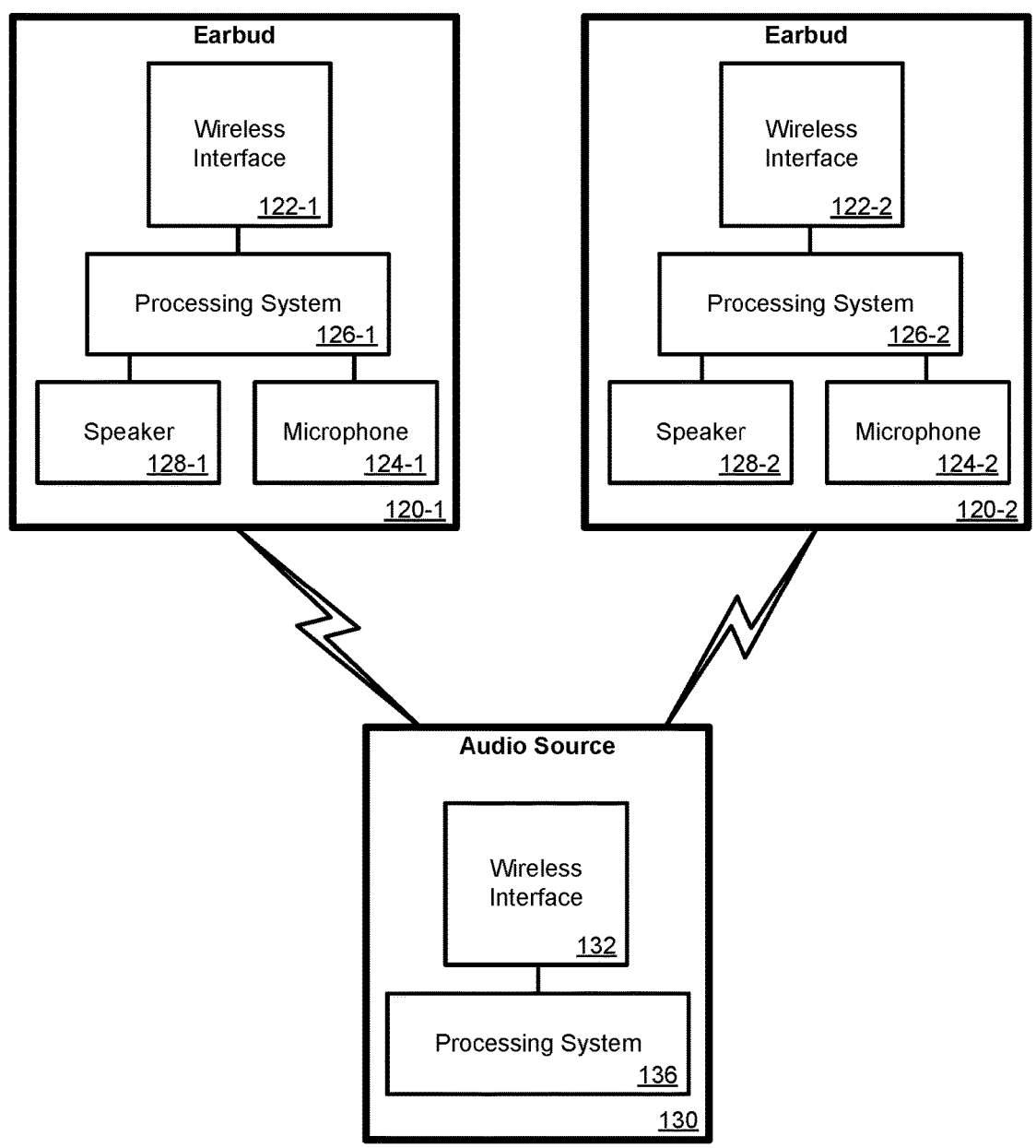
FIG. 1 illustrates an embodiment of a system that includes earbuds communicating with an audio source.

When using TWS earbuds (hereinafter "earbuds") to perform bidirectional audio communication, such as during a phone call, video conference, audio conference, or gaming session, audio is received wirelessly by the earbuds from an audio source (e.g., smartphone, laptop, computer) for output via one or both speakers of the earbuds (referred to as downstream audio) and also audio is captured using one or more microphones of the earbuds. The audio captured by the earbuds is wirelessly transmitted by the earbuds to the audio source (referred to as upstream audio).

For Bluetooth-based communications using Bluetooth LE Audio, BLE Audio's Telephony and Media Audio Profile (TMAP) version 1.0 (or similar) only defines a single upstream audio channel from the earbuds to the audio source for mandatory configurations. Therefore, at a given time, the microphone of one earbud may be active for capturing audio and transmitting the upstream audio to the audio source. If during a phone call or some other form of bidirectional audio communication session that uses Bluetooth LE Audio communication between the earbuds and the audio source, the user happens to disable the earbud that is transmitting the upstream audio from the microphone to the audio source (or the earbud otherwise becomes unavailable, such as its battery being drained or signal loss), then no channel is available to convey the upstream audio back to the audio source.

Conventionally, in order to remedy this situation, the audio source would detect this situation and switch to a different configuration. However, such switching of configurations requires terminating the current configuration and rebuilding a new configuration, which interrupts both upstream and downstream audio for around 0.2 sec~0.5 sec. (Notably, the audio source device, not the earbuds, controls the configuration change. Therefore, while a user may think that the earbuds are to be blamed for the interruption in audio, such blame would be misplaced, yet borne by the earbud manufacturer.)

Another problem can show up if the user reinserts the removed earbud in the user's ear. The reinserted earbud would not output downstream audio until the audio source device switches back to a configuration that accommodates downstream audio being streamed to each earbud. Again here, during this switching process, the earbud previously in the user's other ear would also go dead while the configuration is being terminated and the new configuration is being setup. Again here, the user's experience is less than ideal with the audio being temporarily interrupted.

The Bluetooth LE Audio standard does define a configuration (referred to as "Configuration G"), which defines separate upstream audio channels from both earbuds. However, this configuration requires the use of more bandwidth and power usage since each earbud is required to transmit upstream audio. This prevents the earbuds from potentially periodically taking turns sending back microphone data so as to conserve and balance power consumption. Another potential issue is that the Bluetooth LE Audio standard defines Configuration G as optional, which means that not all earbuds and audio sources will support it. For example, while a pair of earbuds may support Configuration G, the audio source may not.

In various Bluetooth-based embodiments, relying only on the mandatory configuration, the earbuds are not in control of the fundamental user experience. Earbuds would need to rely on the audio source's selection of microphone channel rather than the earbud's selection. Some audio sources (e.g., smartphones) may be configured to combine the microphone audio from both earbuds to construct a mono upstream audio channel while others may choose to use only the left or right earbud, and yet others may choose to switch between earbuds based upon some algorithm executed by the audio source.

As detailed in embodiments herein, a configuration other than Configuration G can be used for communication with the earbuds. Specifically, as detailed herein, no support may be provided for optional Configuration G of Bluetooth LE Audio by a pair of earbuds. Rather, "Configuration C" may be supported, which defines a single upstream audio channel (from a single earbud) and two downstream audio channels (one for each earbud). The earbuds can be configured, as detailed herein, to cause the audio source to select mandatory Configuration C. In embodiments detailed herein, the earbuds can then control which earbud is used for providing the upstream audio. Such arrangements can allow Configuration C to be used continuously despite an earbud being removed, running out of power, or some other reason that causes it to be no longer available. Rather, the earbuds can quickly react to one earbud becoming unavailable and switch which earbud sends the upstream audio while continuously operating in LE Audio Configuration C. Continuous use of Configuration C prevents any interruptions due to configuration changes and can thus improve the user experience.

While this document is focused on examples involving earbuds, embodiments are also applicable to situations where two or more wireless speakers and a microphone present in one of the wireless speakers for return audio are used.

Further detail regarding such embodiments and others is provided in relation to the figures. FIG. 1 illustrates a system 100 in which bidirectional audio is transmitted between earbuds 120 and audio source 130. Downstream audio is transmitted from audio source 130 to earbuds 120 and upstream audio (e.g., voice captured via microphone) is transmitted from one of earbuds 120 to audio source 130. System 100 includes: earbud 120-1 (e.g., a right or left earbud of a pair of true wireless earbuds); earbud 120-2 (e.g., a true wireless earbud for the opposite ear from earbud 120-1); and audio source 130. Communication between earbuds 120 and audio source 130 occurs via a low-power device-to-device communication protocol, such as Bluetooth Low Energy (LE) Audio.

Earbuds 120 can be true wireless earbuds, which refer to a pair of earbuds that do not have any physical connection, such as a wire or band, connecting the two earbuds or with an audio source. True wireless earbuds can allow a user to use both earbuds 120 or use a single earbud (either earbud 120-1 or earbud 120-2) at a given time.

Some components of earbuds 120 are illustrated. Specifically, earbuds 120 include: wireless interfaces 122; microphones 124; processing systems 126; and speakers 128. All components of earbuds 120 can be housed by housings of the respective earbud, which can be made from a rigid or semi-rigid material. Earbuds 120 can be shaped to be at least partially inserted into a user's ear so that it will stay in place during normal body movements.

Wireless interface 122 can be a short-range wireless interface that allows for a device-to-device exchange of data. For example, short-range refers to a distance of up to 1, 10, 15, or 20 meters. Wireless interface 122 can be a Bluetooth interface that allows for data to be exchanged according to a communication protocol from the Bluetooth family of communication protocols, such as Bluetooth basic rate or extended data rate (BR/EDR, which can also be referred to as "Bluetooth classic"), BLE, and/or Bluetooth LE audio. Wireless interface 122 can communicate using the 2.4 GHz band, which for Bluetooth spans from 2.4 GHz to 2.4835 GHz. This frequency band can be divided up into a number of channels, such as 80 channels for Bluetooth BDR/EDR, each 1 MHz wide, or 40 channels for Bluetooth LE or LE Audio, which are each 2 MHz wide. Bluetooth communications can involve frequent channel changes within the 2.4 GHz band, such as up to 1600 channel changes per second.

Wireless interfaces 122 can be understood as Bluetooth wireless interfaces in that each of wireless interfaces 122 can communicate with other Bluetooth interfaces (e.g., wireless interface 132) that conform to the Bluetooth standard. For example, in FIG. 1, audio source 130 has a Bluetooth interface, referred to as wireless interface 132. Wireless interfaces 122 can exchange data using Bluetooth LE with wireless interface 132. For example, wireless interface 132 may be used to transmit downstream audio packets to wireless interfaces 122 while upstream audio packets constructed using audio captured using one or more of microphones 124 are transmitted by wireless interfaces 122 to wireless interface 132.

In earbud 120-1, processing system 126-1 can be in communication with wireless interface 122-1; speaker 128-1; and microphone 124-1. In earbud 120-2, processing system 126-2 can be in communication with wireless interface 122-2; speaker 128-2; and microphone 124-2. Processing systems 126 may include one or more special-purpose or general-purpose processors. Such special-purpose processors may include processors that are specifically designed to perform the functions of the components detailed herein. Such special-purpose processors may be ASICs or FPGAs which are general-purpose components that are physically and electrically configured to perform the functions detailed herein. Such general-purpose processors may execute special-purpose software that is stored using one or more non-transitory processor-readable mediums, such as flash memory or other forms of memory.

Speakers 128 are used for outputting audio to a user. Processing system 126 can control the volume of audio received via wireless interfaces 122. Microphones 124 are present in each of earbuds 120. Microphones 124 can be used to capture audio in the vicinity of earbuds 120, such as speech of a user wearing at least one of earbuds 120 and transmit the captured audio as upstream audio packets via Bluetooth (e.g., Bluetooth LE Audio) to audio source 130. Microphones 124 can also be used to capture audio to perform noise cancellation.

In the embodiments detailed herein, a single earbud may capture and stream upstream audio to audio source 130. Earbuds 120 may decide among themselves which earbud is to transmit upstream audio. For instance, the decision as to which earbud is to transmit upstream audio may be based on battery charge in each earbud, signal strength between each earbud and audio source 130, and/or an amount of noise detected by each earbud on captured audio. In some embodiments, the audio captured by each of microphones 124 is combined together to create an upstream audio stream that is transmitted to audio source 130. A particular earbud of earbuds 120 may be a "master" earbud that determines which earbud is to transmit upstream audio according to such factors. Alternatively, the earbuds may communicate with each other to make a collective decision as to which earbud should transmit upstream audio. In some embodiments, a predefined ordering of which earbud should transmit upstream audio is used. For example, if earbud 120-1 is active, earbud 120-1 may always be given preference for transmitting upstream audio over earbud 120-2. In some embodiments, audio source 130 can select which earbud (nominally) is to send back upstream audio.

Audio source 130 includes wireless interface 132 and processing system 136. Examples of audio source 130 can include: a smartphone; a desktop, laptop, or tablet computer; a gaming device; a smart television; a digital music player device; a smartwatch; smart glasses; an augmented reality or a virtual reality headset; or any other device from which a user may desire to stream audio to earbuds 120 and, possibly, transmit upstream audio from earbuds 120 to audio source 130. Audio source 130 includes wireless interface 132, which can communicate with earbuds 120 using device-to-device communication protocols, such as a Bluetooth communication protocol (e.g., Bluetooth classic, Bluetooth LE, or Bluetooth LE Audio). Therefore, audio source 130 can transmit a downstream audio stream to one or more of earbuds 120 via wireless interface 132 and can receive an upstream audio stream from one or more of earbuds 120.

Processing system 136 may include one or more special-purpose or general-purpose processors. Such special-purpose processors may include processors that are specifically designed to perform the functions of the components detailed herein, such as detailed in relation to processing systems 126.

Figure 2:
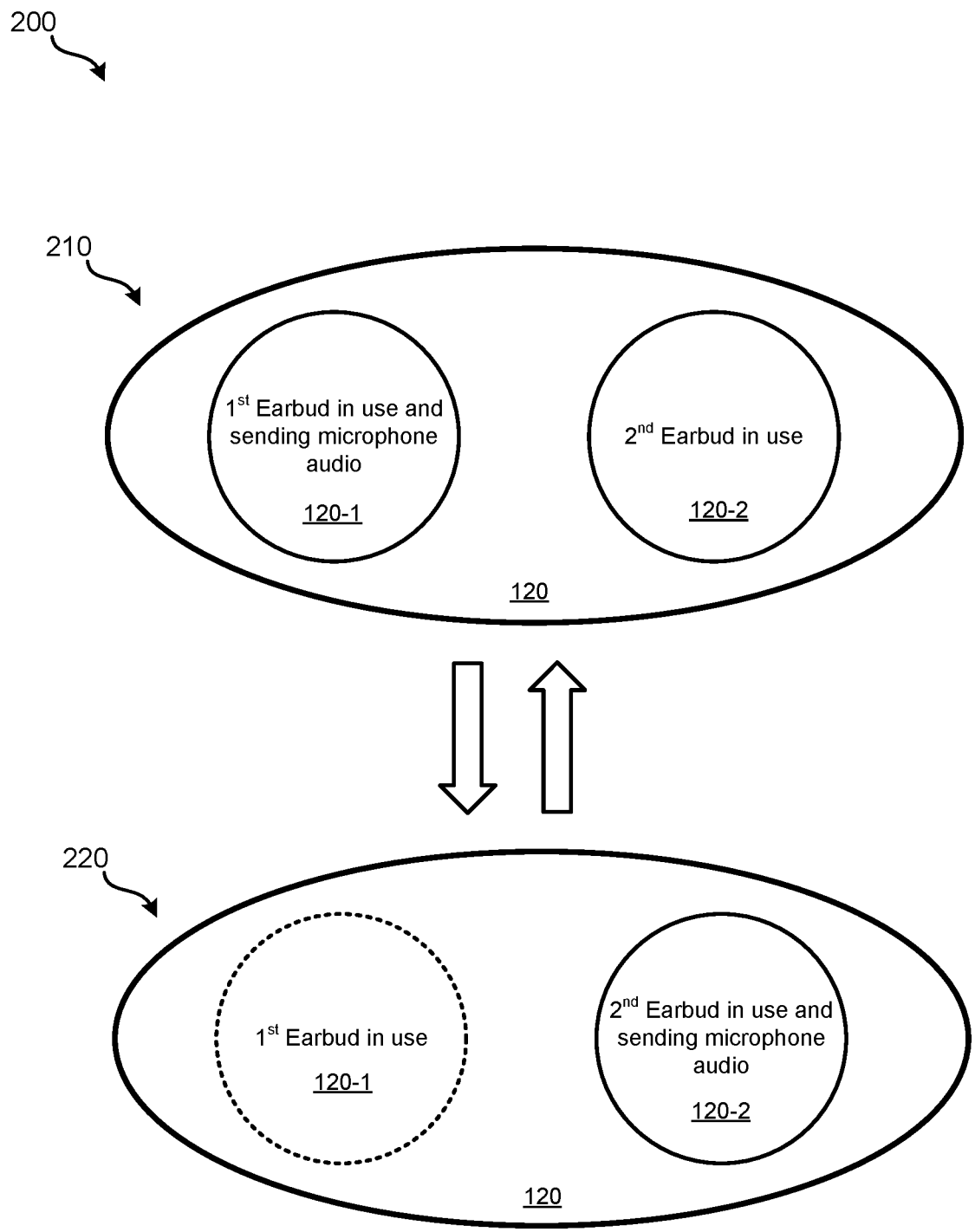
FIG. 2 illustrates a state diagram of earbuds being used by a user.

FIG. 2 illustrates a state diagram 200 of earbuds being used by a user. In state 210, a user is wearing both the left and right earbuds. (As used in this document, a "first earbud" can refer to either the left earbud or right earbud, with the "second earbud" referring to the other earbud.) In this state, both earbuds are receiving and outputting audio received from an audio source (e.g., audio source 130 of FIG. 1). While in this state, the first earbud is transmitting upstream audio from a microphone of the earbuds to the audio source.

Based on one or more conditions occurring, in state 220 the second earbud may begin transmitting upstream audio from its microphone instead of the first earbud. Many circumstances can lead to this change. Examples include: the first earbud having gone out of communication range; the first earbud's battery having been depleted, the first earbud having been stored in its case; a user having powered down the first earbud; or some other form of a communication failure between the first earbud and the audio source. Alternatively, the earbuds may have determined that the upstream audio should switch being transmitted from the second earbud instead of the first earbud despite the first earbud still being capable of transmitting. For example, which earbud is used for upstream data transmission may be switched based on: battery charge of each earbud, signal strength measurements made by each earbud and/or the audio source; and/or noise measurements made by each earbud.

Therefore, while in state 220, the first earbud may or may not remain in use for receiving and outputting via its speaker downstream audio. While in state 220, the second earbud continues to output downstream audio via its speaker (as the second earbud) but also transmits upstream audio from its microphone to the audio source as if it were the first earbud.

A key aspect is that, despite switching between state 210 and state 220, the configuration (e.g., the Bluetooth LE Audio configuration) used for communication between the audio source and the earbuds remains continuously the same without interruption, thus preventing the need to terminate a configuration and rebuild a new configuration, which interrupts both upstream and downstream audio. Therefore, despite switching which earbud is transmitting the upstream audio to the audio source, no configuration change is implemented. Rather, communication between the earbuds and the audio source remain configured such that two downstream audio channels can be transmitted by the audio source and a single upstream audio channel is transmitted by the earbuds to the audio source.

After transitioning back from state 220 to state 210, the second earbud may or may not be in use, as discussed in relation to the first earbud in state 220. States 210 and 220 may continue to switch back and forth as which earbud is used for transmitting the upstream audio is switched. Despite switching once, more than once, or many times, the configuration needed for the communication session with the audio source remains constantly unchanged, such as in "Configuration C" for Bluetooth LE Audio for TMAP (v. 1.0, Table 3.16).

In the embodiments that follow, transfers of packets between earbuds and an audio source are described. In Bluetooth LE and Bluetooth LE Audio, multiple streams are active between devices. A first stream is a continuous isochronous stream (CIS) and the second stream is the asynchronous connectionless link (ACL). While the CIS is used to transmit media packets (e.g., audio packets), the ACL is used to transmit management and control data (e.g., a volume adjustment command). In various embodiments, multiple CISs and ACLs may be present, such as for different pieces of audio that playing simultaneously. The embodiments detailed below are applicable to both CIS and ACL. Therefore, the arrangement and techniques detailed below can be applied to both types of links.

Figure 3A:
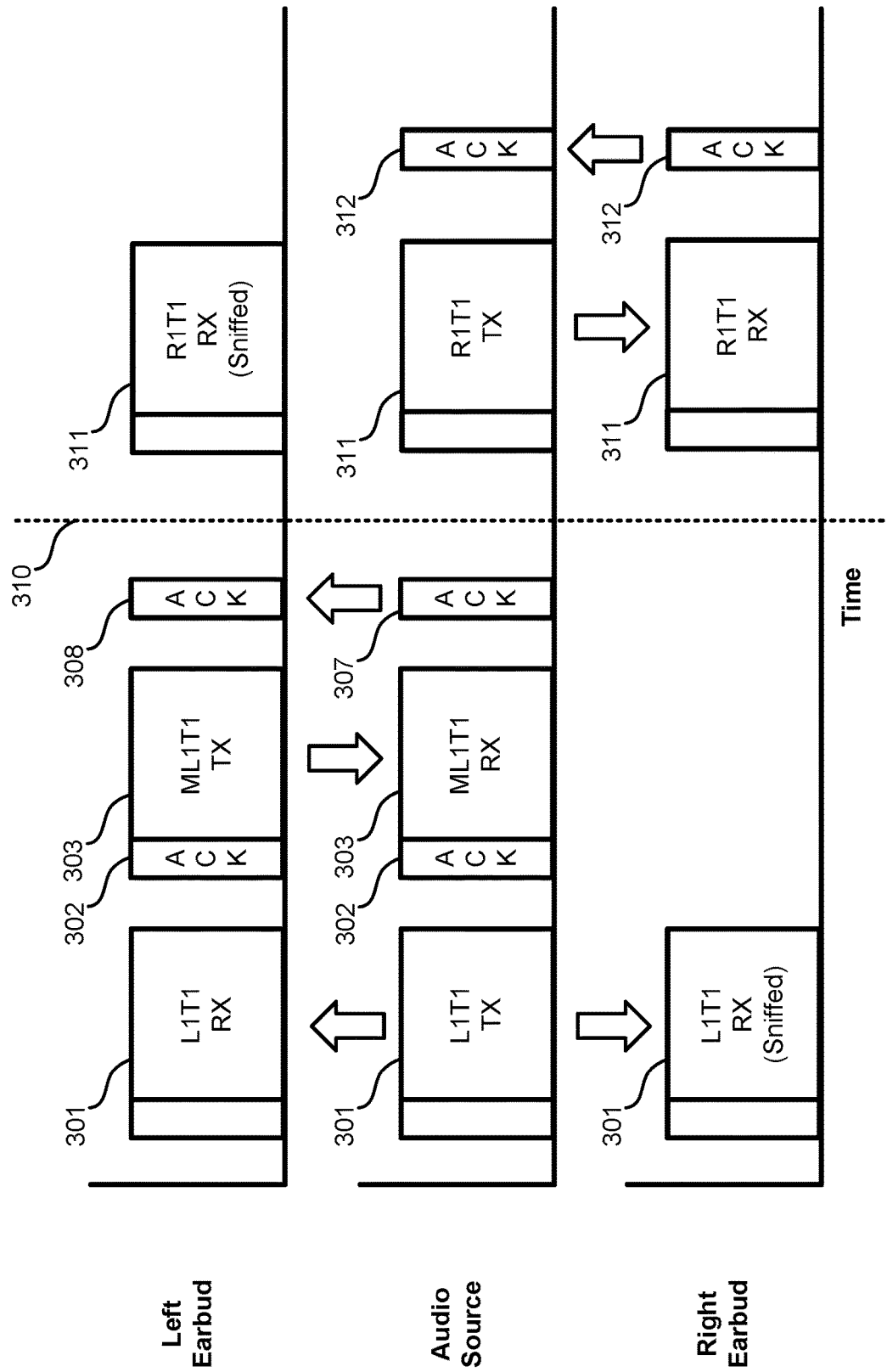
FIGS. 3A and 3B illustrate embodiments of device-to-device packet communication between a pair of earbuds and an audio source.

FIG. 3A illustrates an embodiment of device-to-device packet communication between a pair of earbuds and an audio source. In the illustration of FIG. 3A, the left earbud (which can be either the first or second earbud of FIG. 1) is the primary earbud that is transmitting upstream audio from its microphone to an audio source. While this example focuses on the left earbud, the right earbud can similarly function as the primary earbud that transmits upstream audio packets to the audio source.

In the example of FIG. 3A, the earbuds and the audio source can be communicating using Bluetooth LE Audio. The earbuds and the audio source are further using Configuration C, which specifies two downstream channels of audio (with one downstream channel from the audio source to each of the earbuds) and a single upstream audio channel for microphone audio from the earbuds to the audio source. In this example, the upstream audio channel is expected by the audio source to be received from the left earbud.

Downstream audio packet 301, which is labeled as L1T1, is a first packet addressed to the left earbud (L1) and this is the first attempt (T1) at sending. Packet 301 is transmitted by the audio source (TX) and is received (RX) by the left earbud. The right earbud may sniff packet 301, but not output audio from it. Rather, such data may be used to help increase the chance of properly receiving later transmitted packets.

In response to properly received packet 301, the left earbud transmits acknowledgment 302 to the audio source. Packet 301 may be used by the left earbud for creating an audio signal that is output via a speaker of the left earbud. With acknowledgement 302, the left earbud transmits an upstream data packet 303 containing audio capturing using a microphone. Packet 303 is labeled ML1T1, meaning a first upstream or microphone packet from the left earbud (ML1) being sent for a first attempt (T1). Acknowledgement 302 and packet 303 are received by the audio source. The audio source may then transmit an acknowledgement 307 to indicate to the left earbud that packet 303 was successfully received, this acknowledgement may be received as acknowledgement 308 by the left earbud.

Line 310 can demark separate subevents within an isochronous interval or separate isochronous intervals of Bluetooth LE Audio communications. After line 310, a downstream audio packet is transmitted by the audio source to the right earbud with no upstream audio sent back by the right earbud (since Configuration C of Bluetooth LE Audio only permits one upstream audio channel).

Downstream audio packet 311, which is labeled as R1T1, is a first packet addressed to the right earbud (R1) and is the first try (T1). Packet 311 is transmitted by the audio source (TX) and is received by the right earbud, labeled (RX). The left earbud may sniff packet 311, but perform no actions with it. Acknowledgement 312 is sent by the right earbud to indicate that packet 311 was properly received. Acknowledgement 312 is received by the audio source, which prevents the audio source from further transmission attempts of the packet. Packet 311 is used by the right earbud for creating an audio signal that is output via a speaker of the right earbud.

Figure 3B:
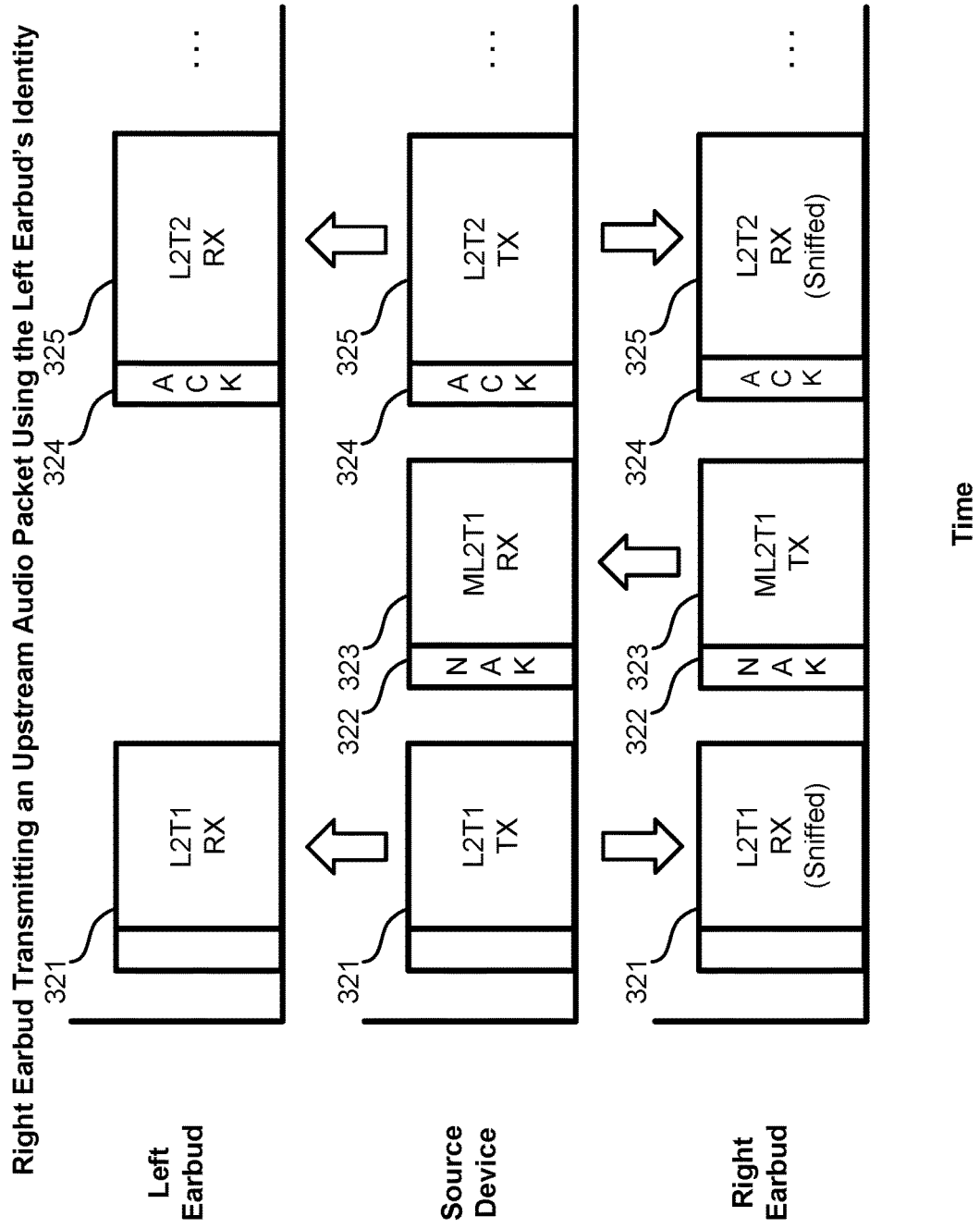

While in FIG. 3A the left earbud transmits upstream audio and the audio source expects the upstream audio to be transmitted by the left earbud, in FIG. 3B, the audio source still expects the upstream audio to be transmitted by the left earbud, but the right earbud is the primary earbud that transmits the upstream audio. The change to FIG. 3B is performed by the earbuds without any reset or change in configuration, thus the audio source and earbuds are still continuously operating in the same configuration, Configuration C, from FIG. 3A.

A key aspect of FIG. 3B is that, since the left earbud is not transmitting its own acknowledgements or negative acknowledgements, the right earbud does not know whether or not downstream audio packets to be used to create audio by the left earbud were properly received by the left earbud. To increase the odds that the left earbud properly receives the packet, the right earbud can always cause some number of retries of each downstream packet addressed to the left earbud. For example, two, three, four, or some maximum permissible number of retries within the isochronous interval may be triggered to be sent by the source device by the right earbud sending negative acknowledgements.

Downstream audio packet 321 is transmitted by the source device and is addressed to the left earbud. Packet 321 is labeled as the second packet (simply to differentiate from the first packet detailed in FIG. 3A), for which this is a first attempt at transmission. Packet 321 may or may not be received properly by the left earbud. Regardless of whether it is received properly, the left earbud is configured to not transmit an acknowledgement or negative acknowledgement. Packet 321, if properly received, however, is used by the left earbud to create and output audio via its speaker. Packet 321 is sniffed by the right earbud. In response to receiving packet 321, despite the right earbud having properly received packet 321, the right earbud transmits negative acknowledgement 322 in response. Therefore, the right earbud is transmitting negative acknowledgement 322 using the identity of the left earbud. Along with negative acknowledgement 322, the right earbud transmits upstream audio packet 323 using the left earbud's identity. (The identity of the earbud can be a Bluetooth address.)

In response to properly receiving packet 323, the audio source transmits acknowledgement 324. Acknowledgement 324 is received by the right earbud and prevents the right earbud from attempting to transmit the data of packet 323 again. Along with acknowledgement 324, the source device sends a second attempt (T2) of the data from packet 321. This retransmission is again addressed to the left earbud and may (or may not) be received by the left earbud; regardless, no acknowledgement or negative acknowledgement is transmitted by the left earbud. If the left earbud did not properly receive packet 321, packet 325 is used instead to create audio for output. if the left earbud did properly receive packet 321, the left earbud ignores packet 325.

Packet 325 is (properly) received (via sniffing) by the right earbud. In response to receiving packet 325, the right earbud may again transmit a negative acknowledgement to trigger the source device to attempt a third try. The greater the number of attempts by the source device, the greater the likelihood that the data within the packet will be received properly at least once by the left earbud. The number of retries triggered by the right earbud can be predefined, such as one, two, three, four, or some maximum permissible number of retries that can be fit within an isochronous interval.

For downstream data packets addressed to the right earbud, the right earbud may acknowledge, as in FIG. 3A, when properly received using the right earbud's own identity. In this embodiment, the right earbud would only create audio for output via its speaker using downstream packets addressed to the right earbud. While, in the example of FIG. 3B, the right earbud assumes the identity of the left earbud, in an alternative embodiment, the reverse can also be true where the left earbud assumes the right earbud's identity in order to transmit upstream audio that the audio source expects to be transmitted by the right earbud.

Figure 4A:
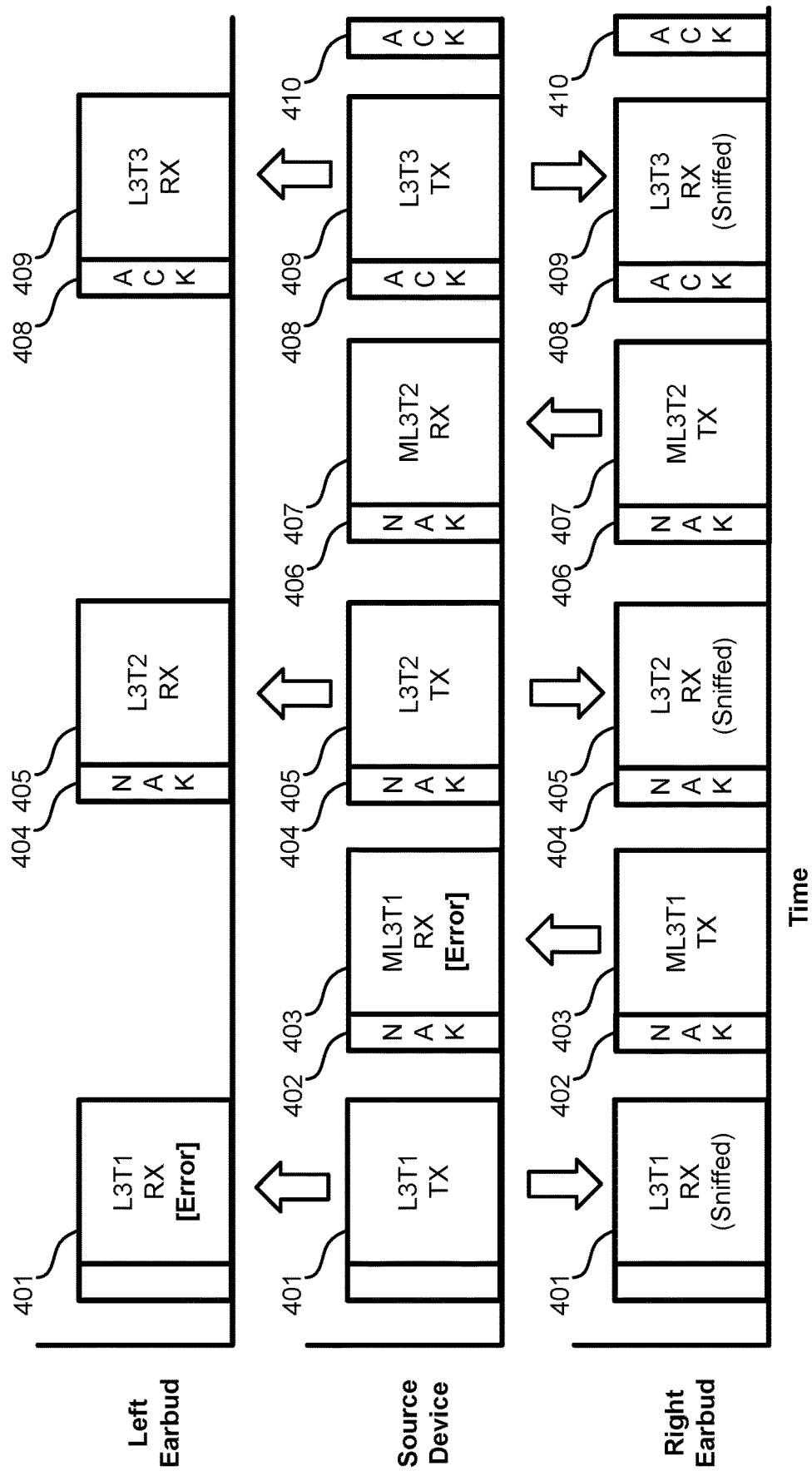
FIG. 4A illustrates another embodiment of device-to-device packet communication between a pair of earbuds and an audio source.

FIG. 4A illustrates an embodiment of device-to-device packet communication between a pair of earbuds and an audio source in which multiple errors occur. For example, interference may be present in the frequency band (e.g., 2.4

GHz) used for communication, the distance between the earbuds and the audio source may be large, or objects (e.g., a person's body) may cause signal attenuation. Again, in the example of FIG. 4A, the audio source expects to receive the upstream audio channel from the left earbud; however, the right earbud is instead the primary earbud that transmits the upstream audio channel such that the configuration used by the earbuds and the audio source does not need to be reset or reconfigured.

In FIG. 4A, a third downstream packet 401 (referred to as "third" simply to differentiate from the packets of FIGS. 3A and 3B), addressed to the left earbud is transmitted by the source device. While packet 401 provides audio that is to be output via the left earbud, the left earbud does not send an acknowledgement or negative acknowledgement in response. Rather, the right earbud, which is using the left earbud's identity to send upstream audio, responds instead. In this example, the left earbud failed to properly receive packet 401. However, the right earbud did properly sniff packet 401.

In embodiment 400A, despite properly receiving packet 401, the right earbud sends a negative acknowledgement 402. Generally, negative acknowledgment 402 is sent regardless of whether packet 401 is properly received or not properly received. This negative acknowledgement helps in this situation where packet 401 was not properly received by the left earbud. Along with negative acknowledgement 402, the right earbud sends an upstream audio packet 403 (ML3T1) to the source device using the left earbud's identity.

In this example, another error occurs here and packet 403 is not received properly by the source device. In response, the source device transmits negative acknowledgement 404. With the negative acknowledgement, the source device transmits a second attempt of the data from packet 401 in response to negative acknowledgement 402. This retransmission as packet 405 is properly received by the left earbud. Again, the left earbud does not send an acknowledgement or negative acknowledgement. The left earbud does use the content of packet 405 to output audio via its speaker, while the right earbud does not use the content of packet 405 or 401 to create and output audio. However, the right earbud does have the option of using these to create output audio in the case of bi-mono audio, in which the same audio is output by each earbud.

The right earbud sniffs packet 405. In this example, the earbuds are configured to cause the same data to be sent at least three total times by the audio source when one earbud is assuming the other earbud's identity. Therefore, despite packet 405 being received properly by the right earbud, negative acknowledgement 406 is transmitted in response by the right earbud to the source device. Negative acknowledgement 406 is accompanied by a second try of the upstream audio packet 407 that is being sent in response to negative acknowledgement 404. Negative acknowledgement and upstream audio packet 407 is sent using the left earbud's identity since the source device is expecting the left earbud to be transmitting the upstream audio. In this example, packet 407 gets properly received by the audio source, thus allowing it to recover from the error in reception of packet 403.

In response to properly receiving packet 407, acknowledgement 408 is transmitted. Acknowledgement 408 is received by the right earbud, thus preventing the right earbud from a third attempt at sending the upstream audio packet. With acknowledgement 408, the source device again sends the downstream audio data as packet 409. In this example, packet 409 is ignored by the left earbud since the data present in packet 409 has already been properly received in packet 405. However, if packet 405 (and packet 401) were not properly received, packet 409 provides a third opportunity for the left earbud to receive the data sent in packets 401 and 405. Packet 409 is again sniffed by the right earbud. Depending on the number of permissible retries available within the isochronous interval and how the earbuds are configured, the right earbud may transmit an acknowledgement to stop further resends or a negative acknowledgement to prompt a third resend of the downstream audio to the left earbud. The secondary earbud, in this case the right earbud, sends back the microphone data using the primary earbud's identity with a negative acknowledgement (404,406) until it sniffs an acknowledgement (408) intended for the primary (left) earbud. In response, the right earbud replies back with an acknowledgement 410 using the primary earbud's identity. The contents of the sniffed packets 401, 405, and 409 may or may not be used by the right earbud to produce audio.

For downstream data packets addressed to the right earbud, the right earbud may acknowledge, as in FIG. 3A, when properly received using the right earbud's own identity. While, in the example of FIG. 4A, the right earbud assumes the identity of the left earbud, in an alternative embodiment, the reverse can be true where the left earbud assumes the right earbud's identity in order to transmit upstream audio that the audio source expects to be transmitted by the right earbud.

As detailed in relation to FIG. 2, the earbuds may continue to swap roles. When the earbud that is expected to send the upstream audio channel to the audio source actually sends the upstream audio channel, the earbuds may behave as detailed in relation to FIG. 3A. However, when the earbud that is not executed to send the upstream audio channel to the audio source sends the upstream audio channel, the earbuds may behave as detailed in relation to FIGS. 3B and 4 such that no Bluetooth LE Audio TMAP configuration reset or change needs to be performed by the audio source.

Figure 4B:
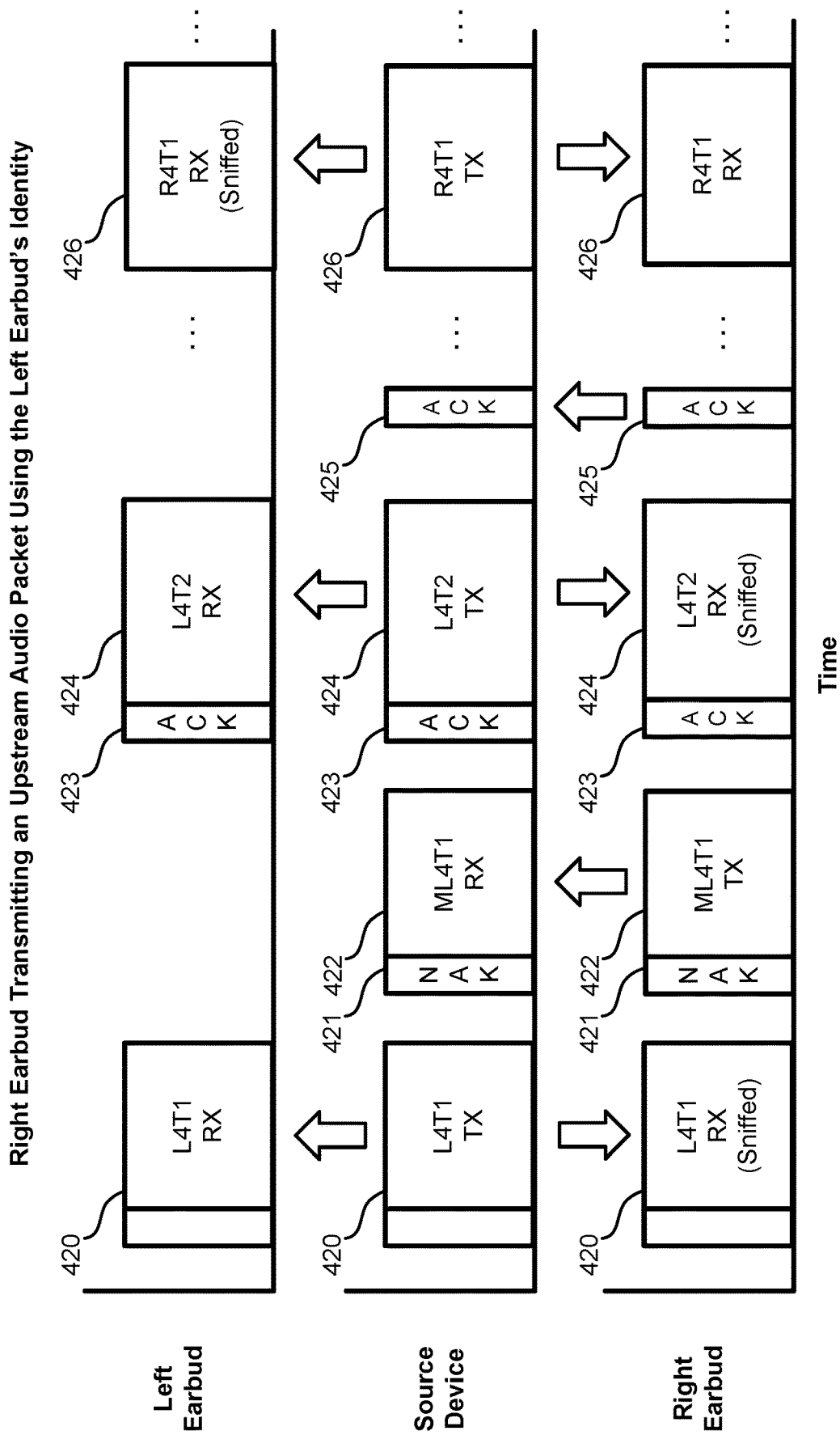
FIG. 4B illustrates an embodiment of device-to-device packet communication between a pair of earbuds and an audio source optimized to decrease communication traffic.

FIG. 4B illustrates an embodiment 400B of device-to-device packet communication between a pair of earbuds and an audio source which has been optimized to decrease the number of retries on transmissions by the source device. While this optimization decreases the number of retransmissions and, therefore, power usage, as a tradeoff, it may slightly increase the likelihood that the left earbud (as illustrated) does not receive at least one of the transmissions of the packet. Again here, as in the example of FIG. 4A, the audio source expects to receive the upstream audio channel to be transmitted by the left earbud; however, the right earbud is instead acting as the primary earbud (by assuming the left earbud's identity) and transmitting the upstream audio channel such that the configuration used by the earbuds and the audio source does not need to be reset or reconfigured.

A key aspect of embodiment 400B is that rather than the right earbud using negative acknowledgements to trigger the source device to resend an audio packet to the left earbud a fixed number of times (e.g., a defined number or the maximum number of times permitted during an isochronous interval), the right earbud sends an acknowledgement indicating proper reception of a downstream audio packet addressed to the left earbud after receiving an acknowledgement in from the source in response to an upstream audio packet, assuming that the downstream audio packet has been triggered to be retransmitted at least once (or some other predefined number of times, such as two or three).

Downstream audio packet 420, which is labeled as L4T1, is a packet addressed to the left earbud (L4, to distinguish from other packets transmitted in this document) and this is the first attempt (T1) at sending. Packet 420 is transmitted by the audio source (TX) and is received (RX) by the left earbud. The right earbud, which is acting as the primary earbud despite the audio source expecting upstream audio packets from the left earbud, sniffs packet 420. Audio may not be output by the right earbud audio based on this packet.

In response to properly received packet 420, since this was the first transmission (T1) of packet L4, the right earbud transmits negative acknowledgement 421 along with upstream audio data packet 422 (ML4T1). The negative acknowledgement and upstream audio data packet is received by the source device. In response to properly receiving packet 422, the source device transmits acknowledgement 423, which is addressed to the left earbud, along with a resend of the packet data as packet 424 (L4T2). Packet 424, which is addressed to the left earbud, is received, in this example, by the left earbud. If packet 420 happened to not be properly received by the left earbud, the same data can be obtained from packet 424, therefore, the left earbud has at least two opportunities to receive the same data.

Packet 424 is also sniffed by the right earbud, which is still acting as the primary earbud. In some embodiments, the right earbud responds with acknowledgement 425 in response to the right earbud receiving acknowledgement 423. In a variation of this embodiment, the right earbud can respond with acknowledgement 425 because of two conditions being satisfied: 1) the data of packet L4 has already been caused to be transmitted at least once; and 2) an acknowledgement in response to the previous upstream packet 422 was transmitted by the source device. In other embodiments, the minimum number of times of condition one may be greater than one. This number can be varied to optimize the tradeoffs of airtime usage, power consumption, and likelihood of reception of a packet by the earbud not transmitting acknowledgements. For example, the minimum number of times of condition one may be varied based on the communication environment (e.g., increase the number of retries in a high noise environment).

In mono audio arrangements, the left earbud, if it failed to receive either packets 420 or 424, may have at least one more opportunity to receive the same data. The same audio data that was transmitted and addressed to the left earbud may again be transmitted by the audio source as addressed to the right earbud in the form of packet 426 indicated as R4T1. The left earbud can sniff packet 426 and output audio based on packet 426 if the previous L4 packets addressed to the left earbud were not successfully received. Even additional chances to receive the same data may be present for the left earbud if the right earbud happens to transmit a negative acknowledgement in response to R4T1, such as if R4T1 is not properly received by the right earbud.

While the previous diagrams refer to "left" and "right" earbuds, it should be understood that the roles may be reversed. Therefore, for example, the left earbud can be understood as either a first or second earbud, while the right earbud can be understood as the remaining second or first earbud.

Figure 5:
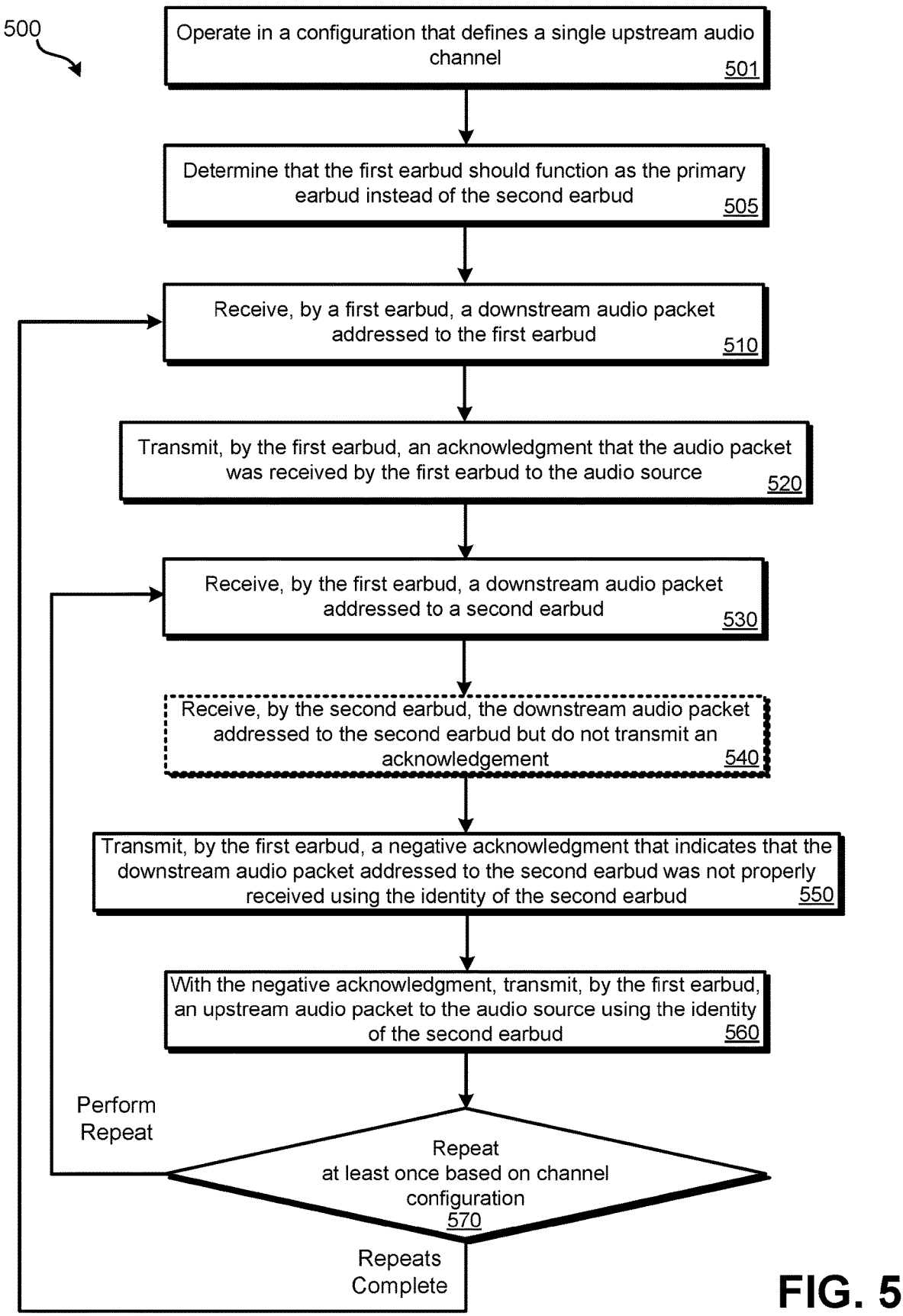
FIG. 5 illustrates an embodiment of a method for device-to-device packet communication between a pair of earbuds and an audio source.

Various methods may be performed using the systems, states, and arrangements detailed in relation to FIGS. 1-4. FIG. 5 illustrates an embodiment of a method 500 of device-to-device packet communication between a pair of earbuds and an audio source in which an earbud assumes the identity of the other earbud in order to transmit the upstream audio stream without requiring any configuration reset or change. Method 500 refers to "first" and "second" earbuds. Either a left or right earbud can function as the first earbud and the other earbud functions as the second earbud. In method 500, a configuration is used (e.g., Bluetooth LE Audio Configuration C) that specifies two downstream audio channels (one to each earbud) and one upstream audio channel from an earbud to the audio source.

In this example of FIG. 5, the audio source is expecting the upstream audio channel to be received from the second earbud, which is assigned as the primary earbud. Prior to block 505, the earbuds may function conventionally in that each earbud acknowledges its own addressed downstream audio packets and the earbud that is expected to transmit the upstream audio stream (in this example, the second earbud) does so, such as detailed in relation to FIG. 3A. However, at block 505, the earbuds determine that the primary earbud should be switched such that the first earbud transmits the upstream audio channel instead (for instance, referring to FIG. 2, a transition from state 210 to state 220). Despite this determination being made, the configuration with the audio source is not reset or changed and remains continuously the same throughout method 500 (e.g., Bluetooth LE Audio Configuration C) as noted at block 501. Thus, using a method in accordance with the present embodiment, the audio source can continue expecting to receive upstream audio as if from the second earbud.

At block 510, a first earbud receives a downstream audio packet that is addressed to the first earbud. Since the downstream audio packet is addressed to the first earbud and the packet is properly received by the first earbud, the first earbud transmits an acknowledgement in response back to the audio source using its own identity at block 520. If, instead, the packet was not received, a negative acknowledgement would be transmitted using the first earbud's own identity to trigger the audio source to attempt a second transmission of the downstream audio packet.

At block 530, the first earbud receives a (second) downstream audio packet from the audio source that is addressed to the second earbud. This reception is performed via sniffing. Therefore, the first earbud may have access to one or more encryption keys that would be used by the second earbud for receiving and transmitting encrypted data. This same packet transmitted by the audio source may (or may not) be received by the second earbud at block 540. If successfully received by the second earbud, the second earbud can use the audio data from the packet to output audio via the second earbud's speaker. Regardless of whether the packet is received or not by the second earbud, the second earbud does not transmit an acknowledgement or a negative acknowledgement.

At block 550, in response to receiving the downstream audio packet addressed to the second earbud at block 530, the first earbud transmits a negative acknowledgement despite the downstream audio packet having been properly received by the first earbud (with reception by the second earbud being unknown). This negative acknowledgement is transmitted using the identity of the second earbud along with an upstream audio packet at block 560. Therefore, from the perspective of the audio source, the negative acknowledgement and the upstream audio packet appears to have been received from the second earbud (despite it actually coming from the first earbud).

The negative acknowledgement transmitted at block 550 is received by the audio source and triggers the audio source to retransmit the downstream audio packet of block 510 addressed to the second earbud. The upstream audio packet is received and further processed by the audio source. The downstream audio packet can then be resent by the audio source, thus giving the second earbud at least one additional opportunity to receive the downstream audio packet.

At block 570, due to the negative acknowledgement sent by the first earbud, a retry of the downstream audio packet may be sent and received again at blocks 530 and 540. This resend increases the likelihood that the second earbud will have received the downstream audio packet on the first try, the second try, or both. If received on the first try, subsequent receptions of the same packet may be discarded or ignored. Regardless, no acknowledgement or negative acknowledgement is sent by the second earbud.

Blocks 530-560 may repeat multiple times. The number of times which these blocks repeat can be based on how many retries the earbuds are configured to force. In some embodiments, the maximum number of retries within an isochronous interval are used to maximize the likelihood that the downstream packet gets received by the second earbud. If a predefined number of repeats is used, at block 550, once the number of repeats is met, the first earbud may send an acknowledgement rather than a negative acknowledgement to prevent the audio source from performing further resends of the downstream audio packet.

Following block 570, method 500 may return to block 510 for a next downstream audio packet that is being sent to the second earbud from which the audio source expects to receive the upstream audio channel. Notably, downstream audio packets addressed to the first earbud are handled in accordance with FIG. 3A: the first earbud receives and acknowledges downstream packets sent to it from the audio source.

At any time, the earbuds (either collectively or by a particular master earbud) can determine that the earbuds are to return to the state in which the earbud transmitting the upstream audio channel is the earbud that the audio source expects to transmit the upstream audio channel (for instance, referring to FIG. 2, returning from state 220 to state 210). When the upstream audio channel is being sent by the earbud from which the audio source expects the upstream audio channel, each earbud may acknowledge its own received downstream packets as shown in FIG. 3A.

At no point during method 500 does the configuration used by the audio source and earbuds change. Therefore, the same configuration is used continuously, thus preventing any breaks in upstream or downstream audio due to a reset or change in configuration.

Figure 6:
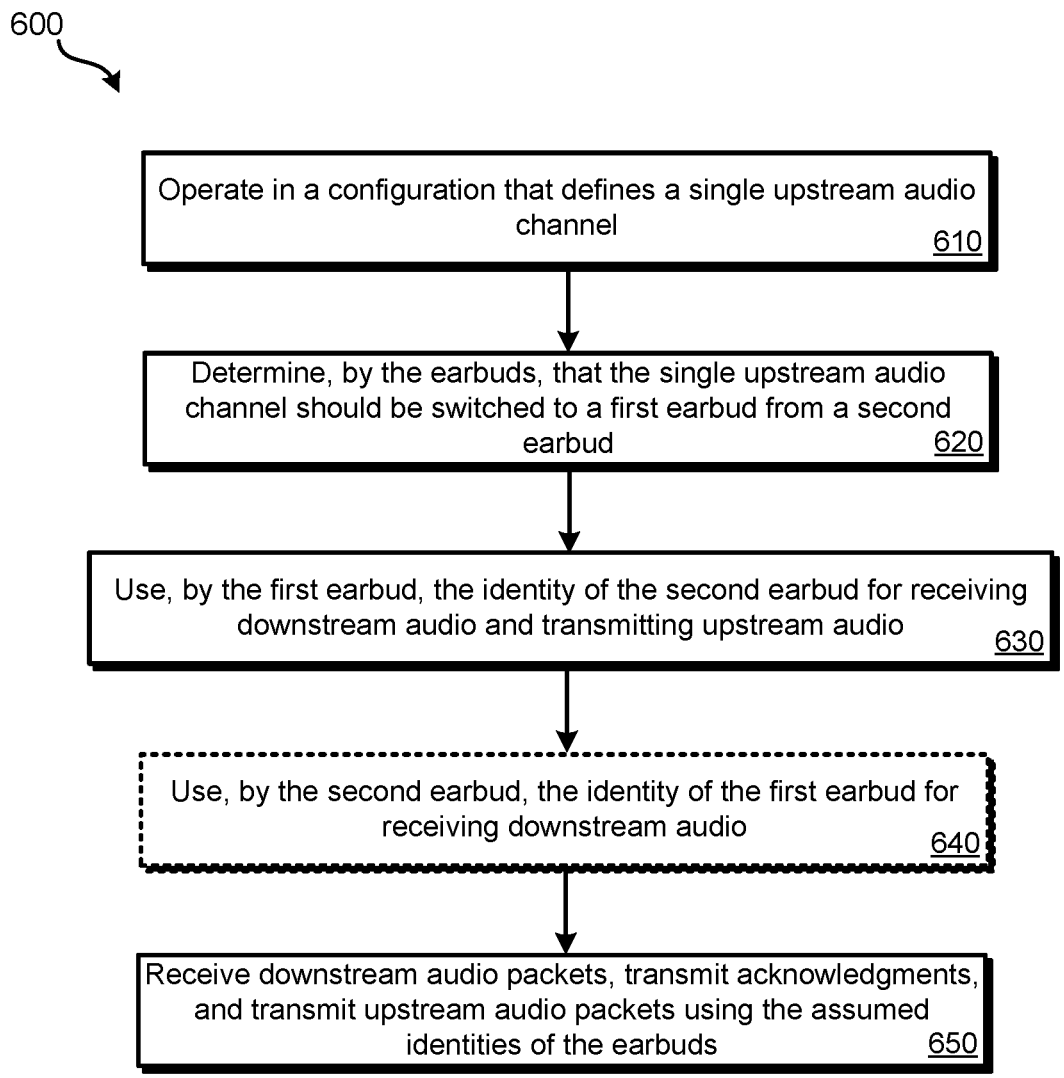
FIG. 6 illustrates another embodiment of a method for device-to-device packet communication between a pair of earbuds and an audio source.

FIG. 6 illustrates an alternative embodiment of how device-to-device packet communication between a pair of earbuds and an audio source can be managed by the earbuds. Method 600 also allows for the earbuds to switch which earbud is transmitting an upstream audio channel without requiring a change or reset of the configuration in which the audio source and earbuds are operating (e.g., Configuration C for Bluetooth LE Audio). Therefore, at block 610 and throughout method 600, the earbuds and audio source communicate in a single configuration.

In this example of FIG. 6, the audio source is expecting the upstream audio channel to be received from the second earbud. Prior to block 620, the earbuds may function conventionally in that each earbud acknowledges its own addressed downstream audio packets and the earbud that is expected to transmit the upstream audio stream (in this example, the second earbud) does so, such as detailed in relation to FIG. 3A. However, at block 620, the earbuds determine that the primary earbud should be switched such that the first earbud transmits the upstream audio channel instead (for instance, referring to FIG. 2, a transition from state 210 to state 220). Despite this determination being made, the configuration with the audio source is not reset or changed and remains continuously the same throughout method 600 (e.g., Bluetooth LE Audio Configuration C) as noted at block 601. Therefore, the audio source expects to receive the upstream audio from the second earbud.

At block 630, the first earbud can use the identity of the second earbud. Use of the second earbud's identity can involve receiving downstream data packets addressed to the second earbud and transmitting acknowledgements (and negative acknowledgments, as needed) in response. The first and second earbuds may exchange encryption keys as needed such that each earbud can assume the identity of the other earbud. The first earbud can output audio addressed for the second earbud. Further, the first earbud transmits upstream audio data packets to the audio source using the identity of the second earbud.

At block 640, the second earbud can use the identity of the first earbud. Use of the first earbud's identity can involve receiving downstream data packets addressed to the first earbud and transmitting acknowledgements (and negative acknowledgments, as needed) in response. The first and second earbuds may exchange encryption keys as needed such that each earbud can assume the identity of the other earbud. The second earbud can output audio addressed for the first earbud. (Alternatively, the second earbud may be unavailable, which may have been the reason for the determination of block 620. In such a case, block 640 may not be performed and the second earbud may not output audio or transmit acknowledgments.)

At block 650, the earbuds may continue to receive downstream audio packets, transmit acknowledgments (and negative acknowledgments as needed), and transmit upstream audio by the first earbud using the flipped identities. After a time, the earbuds may determine that the identities are to be reverted to their original identities. Using the original identities, each earbud may acknowledge downstream audio packets addressed to the respective earbud and the expected earbud (in this case the second earbud) transmits the upstream audio stream to the audio source. At no point does the configuration with the audio source need to be reset or changed.

Figure 7:
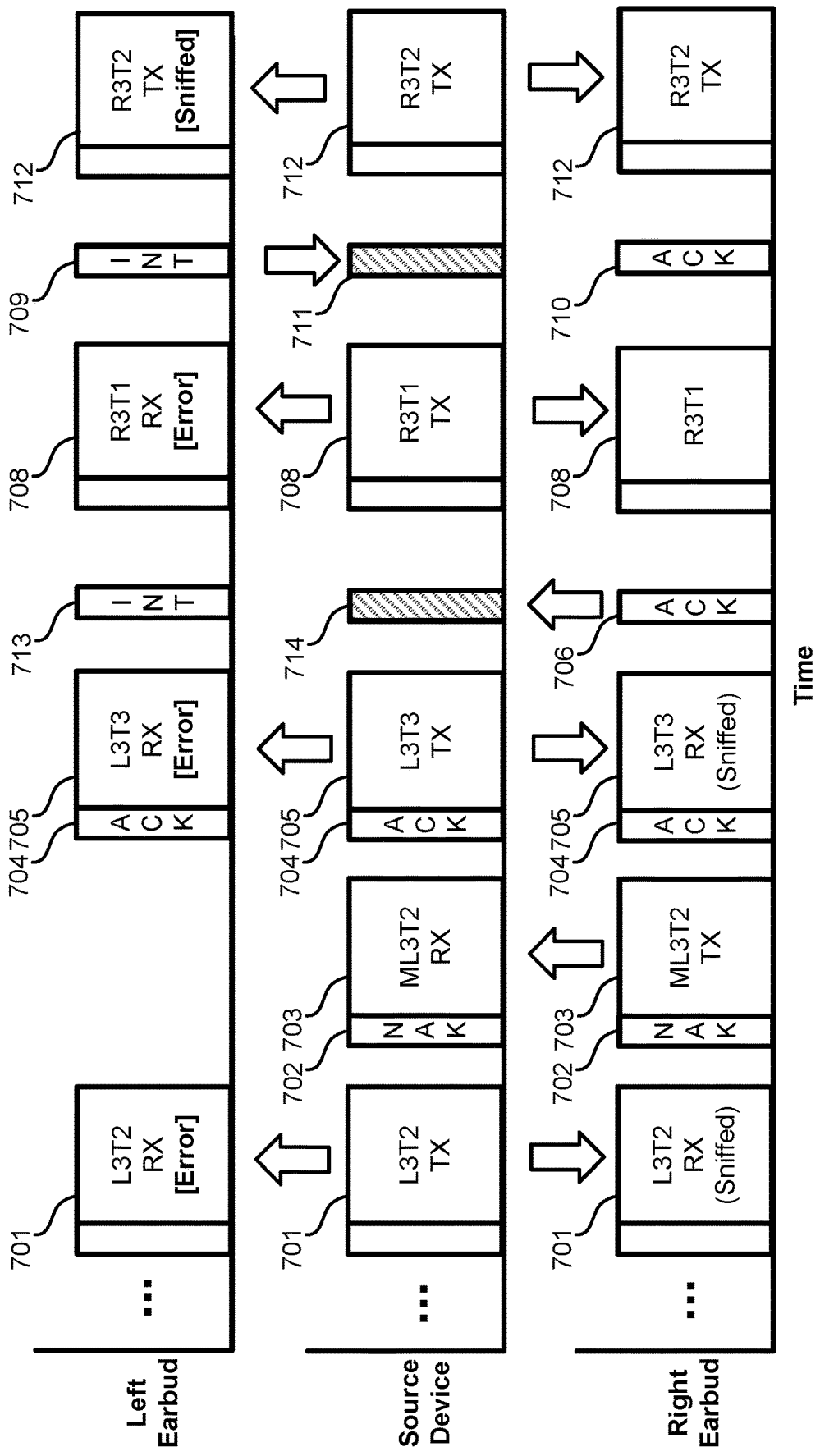
FIG. 7 illustrates an embodiment of device-to-device packet communication between a pair of earbuds and an audio source using interferer packets.

For telephone calls, certain video and/or audio conferencing arrangements, and non-stereo music, a single channel of audio (mono audio) can be present. For TWS earbuds, the audio source sends the same audio data to each earbud separately. This arrangement can be exploited in the situation where an earbud did not properly receive an audio packet, but the same audio data will then be sent to the other earbud by the audio source. FIG. 7 illustrates an embodiment of device-to-device packet communication between a pair of earbuds and an audio source in which, similar to FIG. 4A, the right earbud is transmitting microphone data to the source device using an identity of the left earbud.

FIG. 7 represents an embodiment of single-channel audio packets being sent, such as via LE Audio, to each earbud by a source device in which the source device expects microphone data from the left earbud. As an example, FIG. 7 can represent a phone call. Packet 701, which in this example is a second attempt of a third packet addressed to the left earbud, is successfully received by the right earbud, but not the left earbud. Negative acknowledgement 702 is sent by the right earbud along with packet 703 including microphone data using the identity of the left earbud. As detailed in relation to FIG. 4A, since the left earbud is not transmitting acknowledgments (or negative acknowledgements), the right earbud sends a predefined number of negative acknowledgements such that the left earbud has an increased number of opportunities to receive the packet from which audio is to be output by the left earbud.

In response to negative acknowledgement 702, the source device sends packet 705, which contains the same audio data as packet 701. Acknowledgment 704 is transmitted to indicate that packet 703 was properly received by the source device. Packet 705 is received by the right earbud, but again the left earbud failed to receive packet 705. In this example, the right earbud sends acknowledgment 706 using the left earbud's identity in response to the reception of acknowledgment 704, therefore acknowledgement 706 is transmitted to the source device. However, at this point in time, the data in the packet still has not been successfully received by the left earbud. (In FIG. 7, only two attempts at sending the "L3" packet are shown, however an earlier attempt may have been made for a total of three attempts. In other embodiments, the total number of attempts can be greater or fewer.) Interferer packet 713 is transmitted by the left earbud causing the source device to fail to receive acknowledgement 706. In some embodiments, interferer packet 713 can cause an L3T4 packet to be transmitted depending on the permitted number of retransmissions.

An interferer packet serves the purpose of causing another packet to fail to be properly received—that is, it interferes with proper reception. An example of a low-complexity interfering packet may just be all 0's, all 1's, or an alternating pattern of 1's and 0's for a duration of a 40 bit-period starting within 8 to 16 bits of the expected start time of the packet to be blocked from reception (other patterns or pseudo-random arrangements of 1's and 0's are also possible). Such an arrangement allows the device that is transmitting the interferer packet to have time to scan for the start of the transmission of the packet to be interfered with before starting transmission of the interferer packet.

In an alternative embodiment, the left earbud may not need to transmit interferer packet 713. In the example of FIG. 7, the L3 packet would not be resent (despite no acknowledgement being received by the source device) due to the maximum number of permitted retransmissions in an isochronous interval having been reached. In such a situation, interferer packet 713 would not be needed.

Despite the left earbud not having successfully received the data from packets 701 and 705, since the audio being sent in mono and, therefore, the same for each earbud, the nominal primary earbud (in this example, the left earbud) can sniff the equivalent packet that is subsequently transmitted to the right earbud.

When R3T1 is transmitted as packet 708, the right earbud may (or may not) successfully receive it. The left earbud may attempt to sniff it (e.g., using an encryption key of the right earbud), however, the left earbud failed to successfully receive packet 708. (If the left earbud did successfully sniff packet 708, the left earbud may use the audio data from packet 708 in lieu of missed packets 701 and 705 to output sound. In such a circumstance, no further data may need to be transmitted by the left earbud relevant to packet 708.

However, in the circumstance where packet 708 has not been successfully sniffed by the left earbud and the same data was not successfully received in packets 701 and 705, the left earbud may transmit an interferer packet or interferer signal. The interferer may be a special packet (or signal) that is timed to coincide with when the right earbud transmits acknowledgement 710 (or a negative acknowledgement at the same time). The purpose of the interferer packet is to cause acknowledgement 710 to not be properly received by the source device. Instead, the source device receives corrupted packet 711, which is a combination of interferer packet 709 and acknowledgement 710. Since the acknowledgement is not properly received by the source device, the source device treats the corrupted data as a negative acknowledgement.

Since due to interferer packet 709, no acknowledgement was successfully received by the source device, source device treats corrupted packet 711 as a constructive negative acknowledgement and, thus, resends the data of packet R3 as packet 712.

In this example, packet 712 is successfully received by the left earbud. The left earbud can then buffer and output the audio constructed from the data in packet 712. Since the data of packet 712 was already properly received by the right earbud, the right earbud ignores packet 712. However, if the right earbud had sent a negative acknowledgement instead of acknowledgement 710, the right earbud could also use the audio data from packet 712 to construct, buffer, and output audio.

It is also possible that if packet 712 was not properly received by the left earbud, the left earbud is permitted to send one or more additional interferer packets to cause the source device to send a third or greater retry of the data of packets 708 and 712. For instance, interferer packets may be permitted to be sent such that the data of the packet is sent at least three, four, or more times. In some embodiments, the limiting factor may be the flush timeout (FT) of the source device or a predefined number of permissible interferer packets maintained by the earbuds.

As in previous examples, the roles of each earbud may be switched such that the right earbud is the nominal primary earbud from which the source device expects to receive microphone data. In such a reversal, the right earbud may instead transmit interferer packets to cause retransmits of packets addressed for the left earbud.

Figure 8:
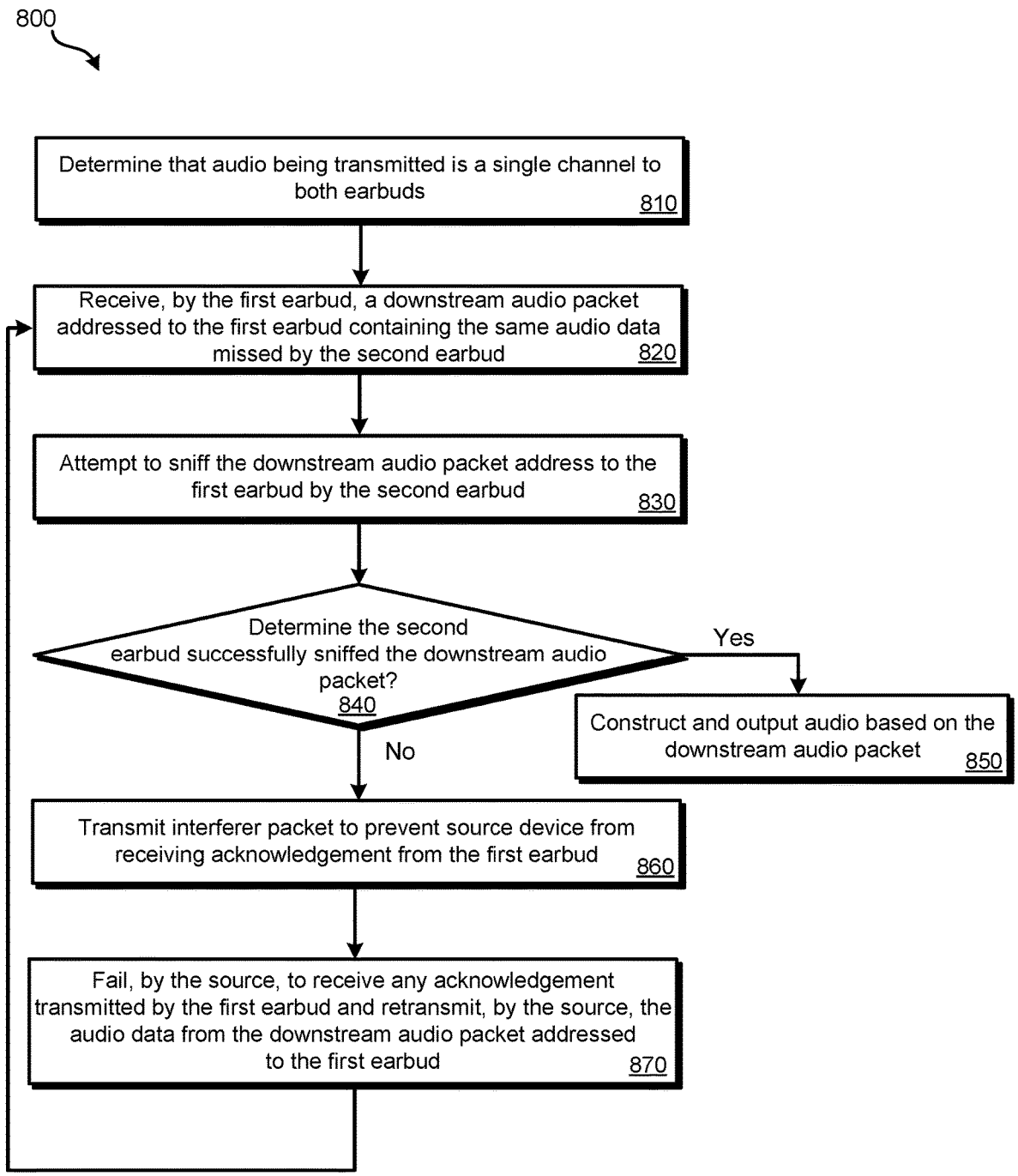
FIG. 8 illustrates an embodiment of a method for device-to-device packet communication between a pair of earbuds and a mono audio source using interferer packets.

Method 800 of FIG. 8 can be performed as an expansion of method 500 of FIG. 5. Referring to method 500, after the repeats of block 570, the second earbud might not have successfully received the downstream audio packet addressed to the second earbud at block 540 regardless of the number of repeats performed. Therefore, the second earbud still needs the data contained in the downstream audio packet, or the missed audio would cause an auditory glitch at the second earbud due to the missed audio. (If the second earbud did successfully receive the audio packet at block 540, method 800 does not need to be performed.)

However, method 800 may be performed when the second earbud is in such a situation of having missed the downstream audio packet. At block 810, a determination may be made that the audio being transmitted to the earbuds is a single or mono channel. This determination may be made by the earbuds or by the audio source device. If made by the audio source device, the information indicative of the determination may be sent to the earbuds, such as via an ACL. Since the mono audio data is sent to each earbud separately, the same audio data that was sent to the second earbud is also to be sent to the first earbud. Since the second earbud is nominally the earbud from which the source device expects to receive microphone data, the next packet sent to the first earbud can be expected to include the audio that is the same as was transported by the packet that was missed by the second earbud at block 540.

At block 820, the source device may transmit and the first earbud may receive, a downstream audio packet that includes the same audio data as the audio packet(s) missed by the second earbud at block 540. In response to receiving the downstream audio packet at block 820, the first earbud may transmit an acknowledgement. (If the downstream audio packet at block 820 is not successfully received by the first earbud, the first earbud would instead transmit a negative acknowledgement.)

At block 830, concurrently with block 820, the second earbud attempts to sniff the downstream audio packet addressed to the first earbud. If the second earbud determines it successfully sniffed the downstream audio packet at block 840, the downstream audio packet can be used to construct and output audio at block 850 by the second earbud and no acknowledgment, negative acknowledgment, or interferer packet is sent by the second earbud. (However, the first earbud may transmit a negative acknowledgement if it did not receive the packet properly and, thus, and a resend would occur, but could be ignored by the second earbud.)

However, if the second earbud determines it did not successfully receive the downstream audio packet, it proceeds to block 860 at which an interferer packet or signal is transmitted to be at the same time during which the first earbud transmits its acknowledgement or negative acknowledgement for the received downstream audio packet of block 820. The interferer packet causes any acknowledgement transmitted by the first earbud to not be successfully received by the audio source device. In response, the source device retransmits the same audio data again in a retry of the downstream audio packet at block 870. Following block 870, method 800 may repeat up to some permissible number of times that is limited by a flush timeout of the source device, the second earbud successfully sniffing the downstream audio packet, or a predefined maximum number of permitted interferer packets maintained by the earbuds.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known, processes, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method for managing which earbud transmits microphone audio, the method comprising:
   receiving, by a first earbud of a pair of true wireless earbuds, a downstream audio packet addressed to a second earbud of the pair of the true wireless earbuds;
   transmitting, by the first earbud, a negative acknowledgement indicating that the downstream audio packet was not properly received despite the first earbud having properly received the downstream audio packet; and
   transmitting, by the first earbud, with the negative acknowledgment, an upstream audio packet using an identity of the second earbud, wherein audio included in the upstream audio packet was captured using a microphone of the first earbud.

2. The method of claim 1, further comprising:
   prior to receiving the downstream audio packet, determining, by the pair of the true wireless earbuds, that the first earbud is to begin serving as a primary earbud instead of the second earbud, wherein the primary earbud is responsible for wirelessly transmitting audio captured using one or more microphones of the pair of true wireless earbuds data.

3. The method of claim 1, further comprising:
   receiving, by the first earbud, an acknowledgement that the upstream audio packet was properly received by a source device and a resend of the downstream audio packet addressed to the second earbud; and
   transmitting, by the first earbud, an acknowledgement to the source device in response to the received acknowledgement that the upstream audio packet was properly received by the source device.

4. The method of claim 1, further comprising:
   receiving, by the first earbud, a second downstream audio packet addressed to the first earbud; and
   transmitting, by the first earbud, in response to receiving the second downstream audio packet, an acknowledgment that the second downstream audio packet was properly received by the first earbud.

5. The method of claim 4, further comprising:
   receiving, by the second earbud, the downstream audio packet, the resend of the downstream audio packet, or both, wherein the second earbud does not transmit either an acknowledgment or negative acknowledgment in response to receiving.

6. The method of claim 5, further comprising:
   prior to receiving the downstream audio packet and prior to determining that the first earbud is to begin serving as the primary earbud, receiving, by the second earbud, a second downstream audio packet, wherein the second earbud is serving as the primary earbud when the second downstream audio packet is received;

transmitting, by the second earbud, an acknowledgement indicating that the second downstream audio packet was properly received by the second earbud; and
transmitting, by the second earbud, with the acknowledgment, a second upstream audio packet using the identity of the second earbud, wherein the audio included in the upstream audio packet was captured using a microphone of the second earbud.

7. The method of claim 6, wherein the earbuds and an audio source communicate using the Bluetooth Low Energy (LE) Audio protocol.

8. The method of claim 7, wherein a single Bluetooth LE Audio Telephony and Media Audio Profile (TMAP) configuration is used continuously while the second earbud serves as the primary earbud and transmits the second upstream audio packet and while the first earbud serves as the primary earbud and transmits the upstream audio packet.

9. The method of claim 8, wherein the single Bluetooth LE Audio TMAP configuration is Configuration C.

10. The method of claim 1, further comprising:
receiving, by the first earbud, a second downstream audio packet addressed to the first earbud, wherein the second downstream audio packet includes same audio data as the downstream audio packet due to a mono audio channel being output to the pair of the true wireless earbuds;
determining, by the second earbud, that the second downstream audio packet addressed to the first earbud was not successfully sniffed; and
in response to determining that the second downstream audio packet was not successfully sniffed, transmitting, by the second earbud, an interferer packet timed to prevent an acknowledgment transmitted by the first earbud in response to the second downstream audio packet from being successfully received by an audio source device.

11. A wireless earbud system, comprising:
a first earbud comprising: a first wireless interface, a first speaker, a first processing system, and a first microphone; and
a second earbud comprising: a second wireless interface, a second speaker, a second processing system, and a second microphone, wherein:
the first earbud is not physically connected with the second earbud;
the first earbud is configured to receive a downstream audio packet addressed to the second earbud;
the first earbud is configured to transmit a negative acknowledgement indicating that the downstream audio packet was not properly received despite the first earbud having properly received the downstream audio packet; and
the first earbud is configured to transmit, with the negative acknowledgment, an upstream audio packet using an identity of the second earbud, wherein audio included in the upstream audio packet was captured using the first microphone of the first earbud.

12. The wireless earbud system of claim 11, wherein the first earbud and the second earbud are configured to, prior to receiving the downstream audio packet, determine that the first earbud is to begin serving as a primary earbud instead of the second earbud, wherein the primary earbud is responsible for wirelessly transmitting audio captured using one or more microphones of the first and second earbud.

13. The wireless earbud system of claim 11, wherein the first earbud is further configured to:

receive an acknowledgement that the upstream audio packet was properly received by a source device and a resend of the downstream audio packet addressed to the second earbud; and
transmit an acknowledgement to the source device in response to the received acknowledgement that the upstream audio packet was properly received by the source device.

14. The wireless earbud system of claim 11, wherein the first earbud is further configured to:
receive a second downstream audio packet addressed to the first earbud; and
transmit, in response to receiving the second downstream audio packet, an acknowledgment that the second downstream audio packet was properly received by the first earbud.

15. The wireless earbud system of claim 14, wherein the second earbud is configured to receive the downstream audio packet, the resend of the downstream audio packet, or both, wherein the second earbud is configured to not transmit either an acknowledgment or negative acknowledgment in response to receiving.

16. The wireless earbud system of claim 15, wherein the second earbud is further configured to:
prior to receiving the downstream audio packet and prior to determining that the first earbud is to begin serving as the primary earbud, receive a second downstream audio packet, wherein the second earbud is serving as the primary earbud when the second downstream audio packet is received;
transmit an acknowledgement indicating that the second downstream audio packet was properly received by the second earbud; and
transmit, with the acknowledgment, a second upstream audio packet using the identity of the second earbud, wherein the audio included in the upstream audio packet was captured using the second microphone of the second earbud.

17. The wireless earbud system of claim 16, wherein the first earbud and the second earbud communicate with an audio source communicate using the Bluetooth Low Energy (LE) Audio protocol.

18. The wireless earbud system of claim 17, wherein a single Bluetooth LE Audio Telephony and Media Audio Profile (TMAP) configuration is used continuously while the second earbud serves as the primary earbud and transmits the second upstream audio packet and while the first earbud serves as the primary earbud and transmits the upstream audio packet.

19. The wireless earbud system of claim 18, wherein the single Bluetooth LE Audio TMAP configuration is Configuration C.

20. A wireless earbud, comprising:
a wireless interface;
a microphone; and
a speaker; and
a processing system in communication with the wireless interface, the microphone, and the speaker, wherein:
the wireless earbud is not physically connected with a second earbud;
the wireless earbud is configured to receive a downstream audio packet addressed to the second earbud;
the wireless earbud is configured to transmit a negative acknowledgement indicating that the downstream audio packet was not properly received despite the wireless earbud having properly received the downstream audio packet; and the wireless earbud is configured to transmit, with the negative acknowledgment, an upstream audio packet using an identity of the second earbud, wherein audio included in the upstream audio packet was captured using the microphone of the wireless earbud.

\* \* \* \* \*